(12) United States Patent
Roche et al.

(10) Patent No.: US 12,547,490 B1
(45) Date of Patent: Feb. 10, 2026

(54) MACHINE LEARNING-BASED DETECTION OF THERMAL ANOMALIES IN INFORMATION TECHNOLOGY INFRASTRUCTURE ENVIRONMENTS

(71) Applicant: Dell Products L.P., Round Rock, TX (US)

(72) Inventors: Ian Roche, Glanmire (IE); Colin Stewart Byrne, Newmarket on Fergus (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/796,584

(22) Filed: Aug. 7, 2024

(51) Int. Cl.
*G06F 11/00* (2006.01)
*G06F 1/20* (2006.01)
*G06F 11/07* (2006.01)
*G06T 7/00* (2017.01)

(52) U.S. Cl.
CPC .......... *G06F 11/0793* (2013.01); *G06F 1/206* (2013.01); *G06F 11/079* (2013.01); *G06T 7/0004* (2013.01); *G06T 2207/20084* (2013.01)

(58) Field of Classification Search
CPC ..... G06F 11/0793; G06F 11/079; G06F 1/206
USPC ....................................................... 714/1–57
See application file for complete search history.

(56) References Cited

U.S. PATENT DOCUMENTS

2004/0262409 A1\* 12/2004 Crippen ............. H05K 7/20836
165/80.3
2008/0147363 A1\* 6/2008 Dalton .................... G06F 1/206
703/5
2017/0060197 A1\* 3/2017 Chia ................... H05K 7/20563
2018/0070898 A1\* 3/2018 Kravis ................... G06F 3/0304
2019/0011965 A1\* 1/2019 Seyed ..................... G06F 3/011
2019/0138423 A1\* 5/2019 Agerstam ........... H04L 63/1425
2021/0011797 A1\* 1/2021 Robison ............. G06F 11/0793
2022/0163398 A1\* 5/2022 Cho ......................... G01J 5/53
2022/0239198 A1\* 7/2022 Dogruoz ........... H05K 7/20236

(Continued)

OTHER PUBLICATIONS

Halo Photonics, "Streamline Allsky Series," https://halo-photonics.com/lidar-systems/streamline-allsky-series/, Accessed Apr. 5, 2024, 8 pages.

(Continued)

*Primary Examiner* — Sarai E Butler
(74) *Attorney, Agent, or Firm* — Ryan, Mason & Lewis, LLP

(57) ABSTRACT

An apparatus comprises at least one processing device configured to generate a first data structure comprising thermal imaging data for an area of an information technology infrastructure environment obtained from thermal imaging sensors, and to process, utilizing at least one thermal anomaly detection machine learning model, at least a portion of the first data structure to generate a second data structure characterizing thermal anomalies detected in the area of the information technology infrastructure environment. The at least one processing device is further configured to select remedial actions to be performed in the information technology infrastructure environment for addressing the thermal anomalies detected in the area of the information technology infrastructure environment, and to perform at least one of the selected remedial actions in the information technology infrastructure environment.

20 Claims, 10 Drawing Sheets

(56) References Cited

U.S. PATENT DOCUMENTS

2022/0404882 A1\* 12/2022 Wanjale ................ F04D 27/004
2023/0043342 A1\* 2/2023 Tremblay ............. H04N 23/698
2024/0102864 A1\* 3/2024 Mazur ..................... G01J 5/025

OTHER PUBLICATIONS

Teledyne Flir, "Fixed Thermal Cameras," https://www.flir.com/browse/industrial/fixed-thermal-cameras/, Accessed Apr. 5, 2024, 3 pages.
S. Wilde et al., "Overview of STFC Daresbury Laboratory Vacuum Operations for the Testing of ESS High Beta Cavities," 31st Linear Accelerator Conference, Aug.-Sep. 2022, 3 pages.
J. Redmon et al., "You Only Look Once: Unified, Real-Time Object Detection," arXiv:1506.02640v5, May 9, 2016, 10 pages.
J. Redmon et al., "YOLO9000: Better, Faster, Stronger," arXiv:1612.08242v1, Dec. 25, 2016, 9 pages.
OpenCV, "Open Computer Vision Library," https://opencv.org/, Accessed Jul. 8, 2024, 10 pages.
J. O. W. Poynton, "Thermal Imaging of A, The helium Jacket Inlet, and B, The Cavity Helium Jacket," https://www.researchgate.net/figure/Thermal-imaging-of-A-the-helium-jacket-inlet-and-B-the-cavity-helium-jacket_fig4_372241023, Accessed Jul. 8, 2024, 3 pages.

\* cited by examiner

MACHINE LEARNING-BASED DETECTION OF THERMAL ANOMALIES IN INFORMATION TECHNOLOGY INFRASTRUCTURE ENVIRONMENTS

BACKGROUND

As the value and use of information continues to increase, individuals and businesses seek additional ways to process and store information. Information processing systems may be used to process, compile, store and communicate various types of information. Because technology and information processing needs and requirements vary between different users or applications, information processing systems may also vary (e.g., in what information is processed, how the information is processed, how much information is processed, stored, or communicated, how quickly and efficiently the information may be processed, stored, or communicated, etc.). Information processing systems may be configured as general purpose, or as special purpose configured for one or more specific users or use cases (e.g., financial transaction processing, airline reservations, enterprise data storage, global communications, etc.). Information processing systems may include a variety of hardware and software components that may be configured to process, store, and communicate information and may include one or more computer systems, data storage systems, and networking systems.

SUMMARY

Illustrative embodiments of the present disclosure provide techniques for machine learning-based detection of thermal anomalies in information technology infrastructure environments.

In one embodiment, an apparatus comprises at least one processing device comprising a processor coupled to a memory. The at least one processing device is configured to generate a first data structure, the first data structure comprising thermal imaging data for at least one area of an information technology infrastructure environment obtained from one or more thermal imaging sensors in the information technology infrastructure environment. The at least one processing device is also configured to process, utilizing at least one thermal anomaly detection machine learning model, at least a portion of the first data structure to generate a second data structure, the second data structure characterizing one or more thermal anomalies detected in the at least one area of the information technology infrastructure environment. The at least one processing device is further configured to select, based at least in part on the second data structure, one or more remedial actions to be performed in the information technology infrastructure environment for addressing the one or more thermal anomalies detected in the at least one area of the information technology infrastructure environment. The at least one processing device is further configured to perform at least one of the selected one or more remedial actions in the information technology infrastructure environment.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
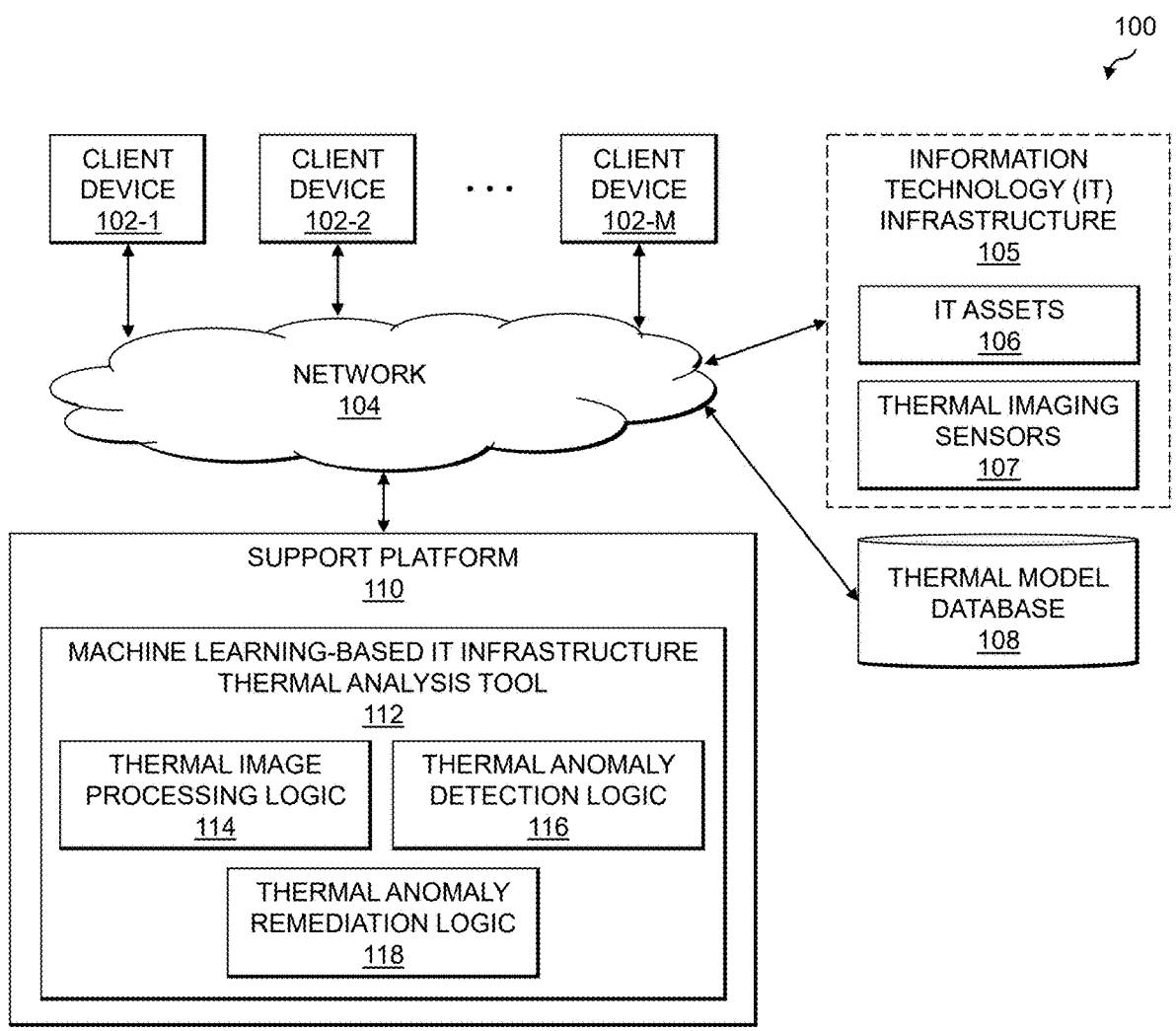
FIG. 1 is a block diagram of an information processing system configured for machine learning-based detection of thermal anomalies in information technology infrastructure environments in an illustrative embodiment.

FIG. 1 shows an information processing system 100 configured in accordance with an illustrative embodiment. The information processing system 100 is assumed to be built on at least one processing platform and provides functionality for machine learning-based detection of thermal anomalies in information technology (IT) infrastructure environments. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106 and one or more thermal imaging sensors 107, a thermal model database 108, and a support platform 110. The IT assets 106 may comprise physical and/or virtual computing resources in the IT infrastructure 105. Physical computing resources may include physical hardware such as servers, storage systems, networking equipment, Internet of Things (IoT)

devices, other types of processing and computing devices including desktops, laptops, tablets, smartphones, etc. Virtual computing resources may include virtual machines (VMs), containers, etc. The thermal imaging sensors 107 comprise thermal cameras or other devices configured to capture thermal images of the IT infrastructure 105. For example, the IT infrastructure 105 may comprise a data center or other IT infrastructure environment in which the thermal imaging sensors 107 are placed in different locations to capture thermal characteristics of different regions thereof (e.g., of "hot" and "cold" aisles of a data center).

In some embodiments, the support platform 110 is used for an enterprise system. For example, an enterprise may subscribe to or otherwise utilize the support platform 110 for managing a set of IT assets, such as the IT assets 106 of the IT infrastructure 105. For example, users of the client devices 102 may utilize the support platform 110 to perform thermal analysis of the IT infrastructure 105 (e.g., to detect thermal anomalies at different locations within the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The thermal model database 108 is configured to store and record various information that is utilized by the support platform 110 and the client devices 102. Such information may include, for example, information that is collected regarding operation of the IT assets 106 of the IT infrastructure 105, thermal images captured before, during and/or after such operation of the IT assets 106 of the IT infrastructure 105, thermal anomaly detection models generated for the IT infrastructure 105, etc. The thermal model database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

The support platform 110 may be provided as a cloud service that is accessible by one or more of the client devices 102 to allow users thereof to perform thermal analysis of the IT infrastructure 105. In some embodiments, the client devices 102 are assumed to be associated with software developers, system administrators, IT managers or other authorized personnel responsible for managing the IT assets 106 of the IT infrastructure 105. In some embodiments, the IT assets 106 of the IT infrastructure 105 are owned or operated by the same enterprise that operates the support platform 110. In other embodiments, the IT assets 106 of the IT infrastructure 105 may be owned or operated by one or more enterprises different than the enterprise which operates the support platform 110 (e.g., a first enterprise provides support functionality for multiple different customers, businesses, etc.). Various other examples are possible.

In some embodiments, the client devices 102 and/or the IT assets 106 of the IT infrastructure 105 may implement host agents that are configured for automated transmission of information with the thermal model database 108 and the support platform 110 (e.g., regarding thermal anomalies detected before, during and/or after operation of the IT assets 106 of the IT infrastructure 105). It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements a machine learning-based IT infrastructure thermal analysis tool 112. The machine learning-based IT infrastructure thermal analysis tool 112 comprises thermal image processing logic 114, thermal anomaly detection logic 116, and thermal anomaly remediation logic 118. The thermal image processing logic 114 is configured to generate a first data structure comprising thermal imaging data for at least one area of the IT infrastructure 105 obtained from the thermal imaging sensors 107. The thermal anomaly detection logic 116 is configured to process at least a portion of the first data structure utilizing at least one thermal anomaly detection machine learning model to generate a second data structure characterizing one or more thermal anomalies detected in the at least one area of the IT infrastructure 105. The thermal anomaly remediation logic 118 is configured to select and perform one or more remedial actions in the IT infrastructure 105 to address the one or more thermal anomalies detected in the at least one area of the IT infrastructure 105.

At least portions of the machine learning-based IT infrastructure thermal analysis tool 112, the thermal image processing logic 114, the thermal anomaly detection logic 116, and the thermal anomaly remediation logic 118 may be implemented at least in part in the form of software that is stored in memory and executed by a processor.

It is to be appreciated that the particular arrangement of the client devices 102, the IT infrastructure 105, the thermal model database 108 and the support platform 110 illustrated in the FIG. 1 embodiment is presented by way of example only, and alternative arrangements can be used in other embodiments. As discussed above, for example, the support platform 110 (or portions of components thereof, such as one or more of the machine learning-based IT infrastructure thermal analysis tool 112, the thermal image processing logic 114, the thermal anomaly detection logic 116, and the thermal anomaly remediation logic 118) may in some embodiments be implemented internal to the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the thermal model database 108 and the support platform 110 or components thereof (e.g., the machine learning-based IT infrastructure thermal analysis tool 112, the thermal image processing logic 114, the thermal anomaly detection logic 116, and the thermal anomaly remediation logic 118) may be implemented on respective distinct processing platforms, although numerous other arrangements are possible. For example, in some embodiments at least portions of the support platform 110 and one or more of the client devices 102, the IT infrastructure 105, the IT assets 106 and/or the thermal model database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the thermal model database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 9 and 10.

It is to be understood that the particular set of elements shown in FIG. 1 for machine learning-based detection of thermal anomalies in IT infrastructure environments is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine learning-based detection of thermal anomalies in IT infrastructure environments will now be described in more detail with reference to the flow diagram of FIG. 2. It is to be understood that this particular process is only an example, and that additional or alternative processes for machine learning-based detection of thermal anomalies in IT infrastructure environments may be used in other embodiments.

In this embodiment, the process includes steps 200 through 206. These steps are assumed to be performed by the support platform 110 utilizing the machine learning-based IT infrastructure thermal analysis tool 112, the thermal image processing logic 114, the thermal anomaly detection logic 116, and the thermal anomaly remediation logic 118. The process begins with step 200, generating a first data structure comprising thermal imaging data for at least one area of an IT infrastructure environment obtained from one or more thermal imaging sensors in the IT infrastructure environment. Step 200 may include colorizing raw data obtained from the one or more thermal imaging sensors to generate a heat map of the at least one area of the IT infrastructure environment.

In step 202, at least a portion of the first data structure is processed utilizing at least one thermal anomaly detection machine learning model to generate a second data structure characterizing one or more thermal anomalies detected in the at least one area of the IT infrastructure environment. The at least one thermal anomaly detection machine learning model may comprise a convolutional neural network (CNN) model. The at least one thermal anomaly detection machine learning model may comprise two or more thermal anomaly detection machine learning models, such as a first thermal anomaly detection machine learning model configured to detect a first type of thermal anomalies in one or more cold airflow paths in the at least one area of the IT infrastructure environment and a second thermal anomaly detection machine learning model configured to a second type of thermal anomalies in one or more hot airflow paths in the at least one area of the IT infrastructure environment.

Figure 2:
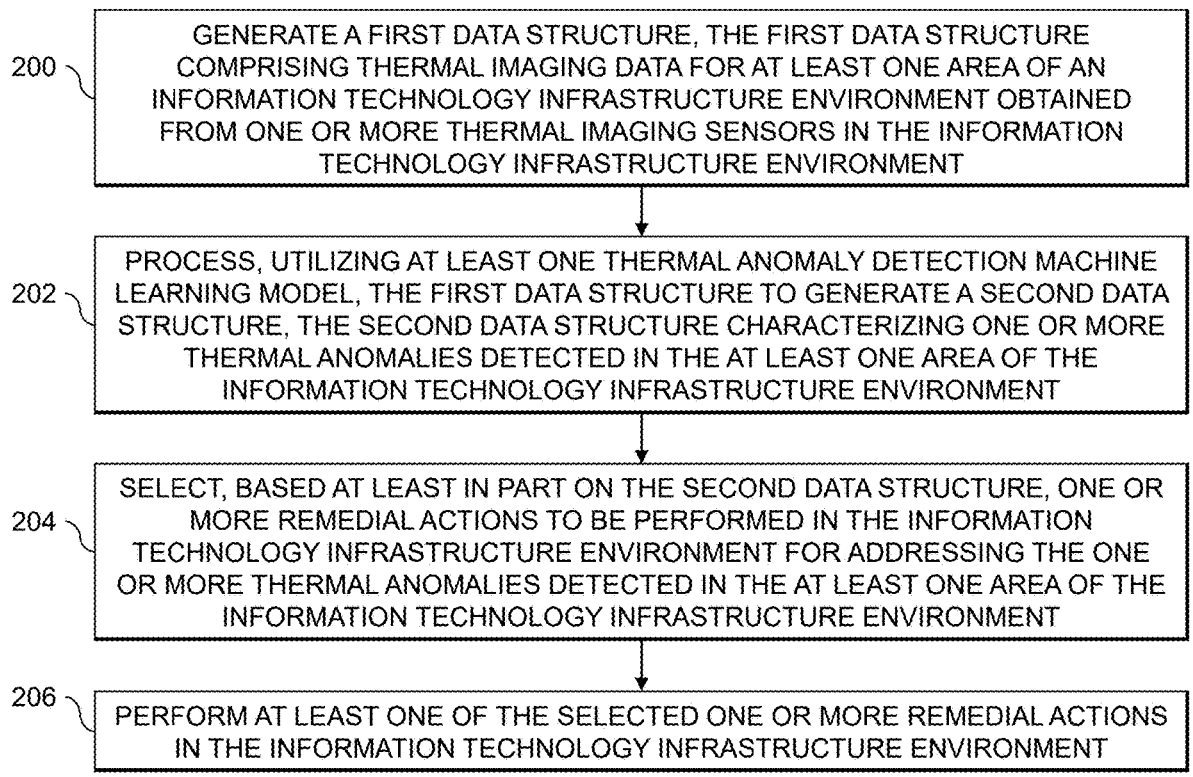
FIG. 2 is a flow diagram of an exemplary process for machine learning-based detection of thermal anomalies in information technology infrastructure environments in an illustrative embodiment.

In some embodiments, the FIG. 2 process further includes training the at least one thermal anomaly detection machine learning model utilizing a first set of data characterizing normal operation of airflows in the at least one area of the IT infrastructure environment and a second set of data characterizing abnormal operation of the airflows in the at least one area of the IT infrastructure environment. The second set of data characterizing the abnormal operation of the airflows in the at least one area of the IT infrastructure environment may comprise: thermal images annotated with one or more thermal anomalies; data obtained from the one or more thermal imaging sensors in the at least one area of the IT infrastructure environment while an operation of one or more cooling systems of the IT infrastructure environment is modified; data obtained from the one or more thermal imaging sensors in the at least one area of the IT infrastructure environment while the airflows in the at least one area of the IT infrastructure environment are at least temporarily intentionally altered; etc.

In step 204, one or more remedial actions to be performed in the IT infrastructure environment are selected based at least in part on the second data structure, the one or more remedial actions are for addressing the one or more thermal anomalies detected in the at least one area of the IT infrastructure environment. The selected one or more remedial actions may comprise modifying an operation of one or more cooling systems responsible for cooling the at least one area of the IT infrastructure environment. The modification of the operation of the one or more cooling systems may be performed until root causes of the one or more thermal anomalies detected in the at least one area of the IT infrastructure environment are identified and fixed. The selected one or more remedial actions may also or alternatively comprise identifying and fixing a root cause of at least one of the one or more thermal anomalies detected in the at least one area of the IT infrastructure environment. Identifying the root cause may comprise identifying at least one of: an obstruction of one or more vents of one or more cooling systems in the IT infrastructure environment; blanking of one or more rack-mounted slots of one or more equipment racks in the IT infrastructure environment that alters airflow paths in the at least one area of the IT infrastructure environment; a malfunction of one or more cooling systems responsible for cooling the IT infrastructure environment; a leak in a designed airflow path of the at least one area in the IT infrastructure environment; etc. In step 206, at least one of the selected one or more remedial actions are performed in the IT infrastructure environment.

It should be noted that the term "data structure" as used herein is intended to be broadly construed. A data structure, such as any single one of or combination of the first and second data structures referred to above, may provide a portion of a larger data structure, or any one of or combination of the first and second data structures may be combinations of multiple smaller data structures. Therefore, the first and second data structures referred to above may be different parts of a same overall data structure, or one or more of the first and second data structures could be made up of multiple smaller data structures. The data structures may include tables, vectors, embeddings, or various other data structures. In some embodiments, the data structures are specifically formatted or generated such that they are suitable for use as at least one of an input to and an output from a machine learning model. It should further be appreciated that "generating" a data structure may encompass, for example, populating a previously-created data structure.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for thermal anomaly detection in different areas of an IT infrastructure environment, in different IT infrastructure environments, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Airflow and cooling within a data center or other IT infrastructure environment is a constant challenge. As equipment (e.g., IT assets such as servers, storage systems, networking equipment, etc.) becomes more powerful, such equipment tends to use more power (e.g., more Watts) and thus the challenge for keeping such equipment cool (e.g., within some designated target temperature range) is exacerbated. A cooling system failure may impact several servers and potentially impact and damage multiple racks of critical infrastructure. This level of outage needs to be avoided at all costs.

The technical challenge of keeping data centers and other IT infrastructure environments cool is only getting more difficult as huge banks of servers are being deployed to run artificial intelligence (AI) workloads, such as generative AI workloads. In a typical scenario, computational fluid dynamics (CFD) simulations are done at the time that a data center is designed to model airflows within the data center. While this is useful for planning an initial layout of the cooling for a data center, it does not account for the "live" state of the data center. For example, various issues can affect the live state of the data center, where such issues are not (and, in at least some instances, cannot be) accounted for through CFD simulations performed at the data center design stage. Such issues include, for example: obstructions being placed over vents; incorrect blanking of servers in racks which lets warm or cold air leak into server aisles; replacing older, lower-power servers with newer, higher-power servers putting additional strain on cooling systems; external factors like building damage (e.g., leaks), coolant leakage in cooling systems, etc. which are often not detected until it is too late; etc. Further, as the size of data centers continues to increase, it is not feasible to manually check each aisle and each rack within an aisle using handheld thermal devices. In addition, as energy costs rise it is desired to avoid over-cooling a data center.

Illustrative embodiments provide technical solutions for combining Computer Vision (CV) and thermal imaging to generate and train thermal anomaly detection models capable of analyzing a scene (e.g., an image of a portion of a data center or other IT infrastructure environment) for thermal anomalies (e.g., unexpected hot or cold spots). Through real-time detection of such thermal anomalies, the impact of cooling failures in a data center or other IT infrastructure environment can be reduced. In some embodiments, AI and machine learning (ML) techniques are applied to protect a data center or other IT infrastructure environment from overheating. AI/ML techniques are also or alternatively used in some embodiments for improving the sustainability of a data center or other IT infrastructure environment, through facilitating efficient cooling of the data center or other IT infrastructure environment to reduce its energy footprint.

Figure 3:
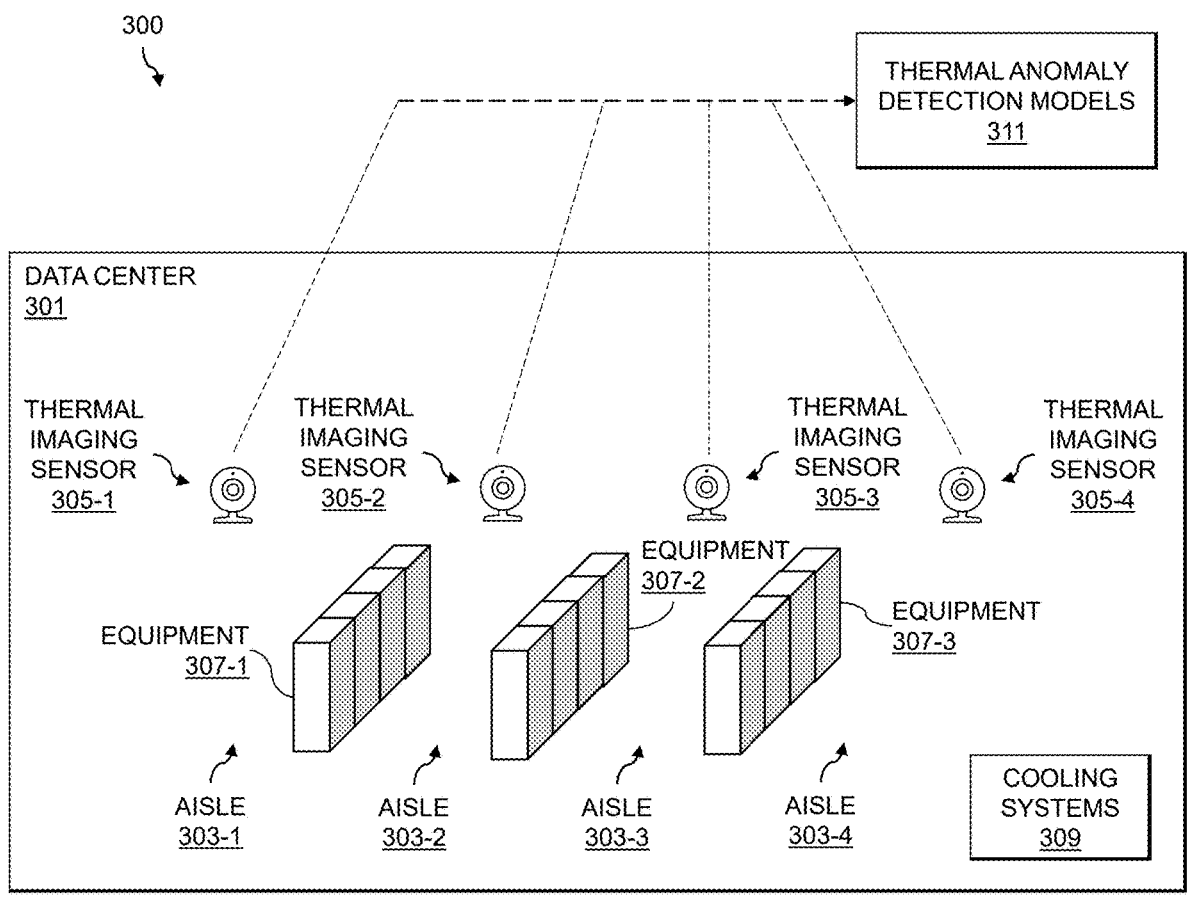
FIG. 3 shows a block diagram of a data center configured with thermal imaging sensors configured to capture thermal images of different aisles of the data center which are provided to data center thermal anomaly detection models in an illustrative embodiment.

In some embodiments, CV analytics and thermal video streams (e.g., obtained from thermal imaging sensors) are utilized to train thermal anomaly detection models that are able to accurately predict thermal anomalies in real-time. FIG. 3 shows a system 300, including a data center 301 (e.g., an example of what is more generally referred to herein as an IT infrastructure or IT infrastructure environment). In the FIG. 3 example, the data center 301 includes a set of aisles 303-1, 303-2, 303-3 and 303-4 (collectively, aisles 303), a set of thermal imaging sensors 305-1, 305-2, 305-3 and 305-4 (collectively, thermal imaging sensors 305), equipment 307-1, 307-2 and 307-3 (collectively, equipment 307) and cooling systems 309. The equipment 307 may comprise, for example, equipment racks in which rack-mounted servers, storage systems, networking equipment or other IT assets are installed. The cooling systems 309 may comprise various heating, ventilation and air conditioning (HVAC) systems responsible for cooling the data center 301.

In the data center 301, each of the aisles 303 is assumed to be designated or designed as a "cold" or a "hot" aisle, where cold aisles provide a source of cool air (e.g., from the cooling systems 309) that enters the equipment 307 and hot aisles provide a path for hot air to exit the equipment 307 (e.g., and circulate through the cooling systems 309). By way of example, the aisle 303-1 may be a "cold" aisle for the equipment 307-1, while the aisle 303-2 is a "hot" aisle for the equipment 307-1 and 307-2. The aisle 303-3 may be a "cold" aisle for the equipment 307-2 and 307-3, and the aisle 303-4 may be a "hot" aisle for the equipment 307-3.

The thermal imaging sensors 305 are configured to provide thermal monitoring of the aisles 303 (e.g., in real time, such as via thermal video streams or thermal images taken at designated intervals such as every X seconds, minutes, etc.). The thermal monitoring data (e.g., thermal images, video streams, etc.) from the thermal imaging sensors 305 are provided to thermal anomaly detection models 311 (e.g., implemented, for example, by the machine learning-based IT infrastructure thermal analysis tool 112 of the support platform 110). The thermal anomaly detection models 311 are configured to utilize the data streamed from the thermal imaging sensors 305 to provide real-time thermal monitoring for the data center 301. As part of such real-time thermal monitoring, when the thermal anomaly detection models 311 detect thermal anomalies, various remedial actions may be triggered. Such remedial actions may include, for example, generating and delivering notifications to data center managers or other authorized users, triggering alarms, adjusting operation of the cooling systems 309 (e.g., at least temporarily adjusting a speed of one or more fans or other features of the cooling systems 309 until a cause of a thermal anomaly is identified and fixed), determining the root cause of thermal anomalies (e.g., detecting obstruction of vents), identifying and performing actions to remedy the thermal anomalies, etc.

It should be appreciated that the particular arrangement of the aisles 303, the thermal imaging sensors 305, the equipment 307 and the cooling systems 309 shown in FIG. 3 is presented by way of example only. For example, while the data center 301 is shown with the equipment 307 being arranged along different aisles 303, this is not a requirement. In other embodiments, equipment 307 may be mounted along one or more walls of a room or other IT infrastructure environment, in different rooms (e.g., offices, server rooms, etc.) within a building, etc. The thermal imaging sensors 305 are positioned to capture the regions or areas of interest (e.g., to be thermally monitored) based on where and how the equipment 307 is installed.

In the system 300 of FIG. 3, there is one thermal imaging sensor 305 per aisle 303. This, however, is not a requirement. There may be multiple thermal imaging sensors 305 for one or more of the aisles 303 (e.g., spaced along the length of one or more of the aisles 303 at predetermined distances to capture with sufficient detail the thermal characteristics of different segments thereof). Further, while FIG. 3 shows the thermal imaging sensors 305 at the "end" of the aisles 303, this is not a requirement. One or more of the thermal imaging sensors 305, in some embodiments, may be ceiling-mounted and configured to capture thermal characteristics of at least a portion of one or multiple ones of the aisles 303. Generally, the particular number of thermal imaging sensors 305 is selected and arranged so as to be able to capture thermal characteristics of each region or area of interest within the data center 301. In some cases, there may be regions or areas within the data center 301 where real-time thermal monitoring is not needed (e.g., for empty aisles, for areas where non-critical equipment is installed, etc.). In such cases, there may not need to be any of the thermal imaging sensors 305 fixed to capture the thermal characteristics of such regions or areas.

Still further, while it is contemplated in some embodiments that the thermal imaging sensors 305 are placed in fixed locations in the data center 301, this is not a requirement. In some embodiments, one or more of the thermal imaging sensors 305 may be mounted to a track or other mechanism which allows one or more of the thermal imaging sensors 305 to move and capture the thermal characteristics of different regions at different times. By way of example, one or more of the thermal imaging sensors 305 may be mounted on tracks that extend along at least a portion of a length of one of the aisles 303, so that the thermal imaging sensor 305 can move along the track to capture thermal images of different segments of the length of the aisle 303. Various other examples are possible.

Figure 4:
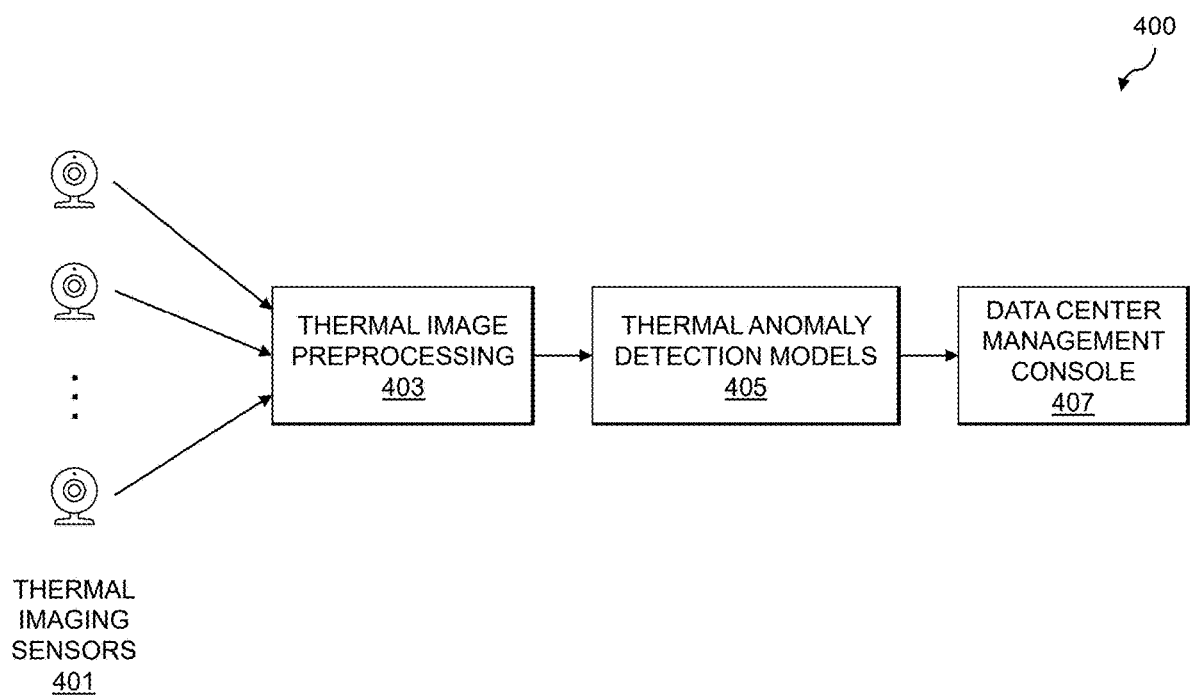
FIG. 4 shows a block diagram of a system flow for thermal anomaly detection in a data center in an illustrative embodiment.
Figure 5:
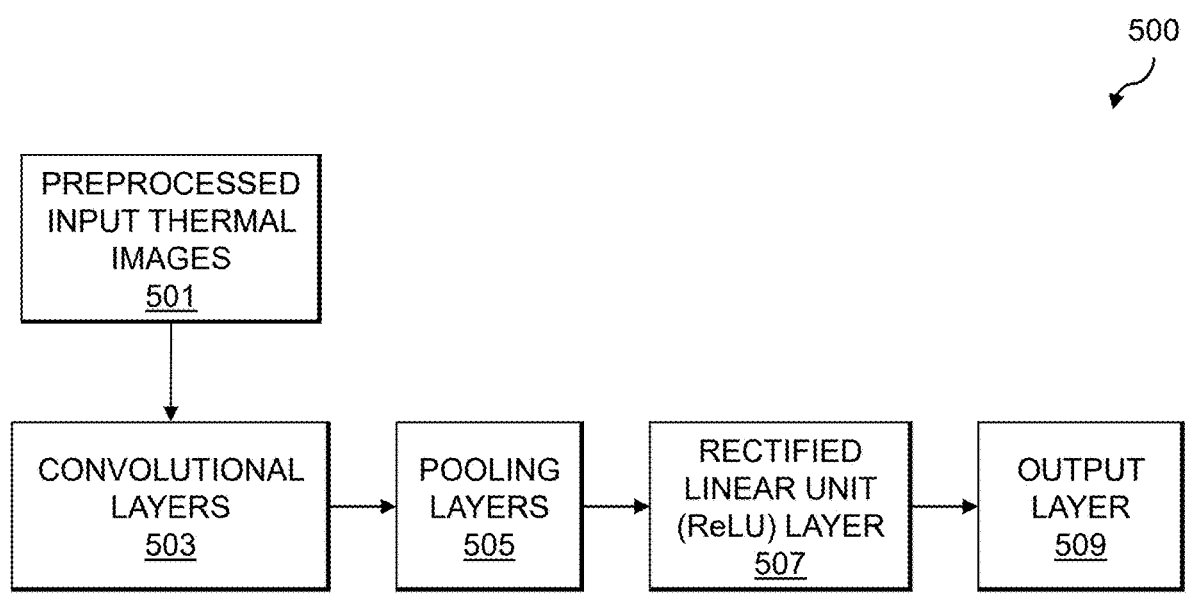
FIG. 5 shows a block diagram of an architecture of a machine learning model configured for detecting thermal anomalies in an information technology infrastructure environment in an illustrative embodiment.

FIG. 4 shows a system flow 400, where a set of thermal imaging sensors 401 provide thermal image data for thermal image preprocessing in block 403. In block 403, thermal image data from the thermal imaging sensors 401 is processed and converted into a format which is suitable for input to thermal anomaly detection models in block 405. This may involve, for example, colorizing the thermal images, generating vector representations or other encodings of the thermal images, etc. In block 405, the thermal anomaly detection models analyze the preprocessed thermal image data to detect thermal anomalies. As will be described in further detail below, in some embodiments multiple thermal anomaly detection models are utilized (e.g., a first thermal anomaly detection model for "hot" aisles, a second thermal anomaly detection model for "cold" aisles). In block 407, thermal anomalies which are detected in block 405 are provided to a data center management console and remedial action is triggered (e.g., alerting specific users, triggering alarms, performing thermal anomaly root cause analysis, adjusting operation of cooling systems, etc.).

The thermal anomaly detection models in block 405 are configured to stream data from the thermal imaging sensors 401 (after preprocessing in block 403) and perform inference on the thermal image data in real-time. If any of the thermal imaging sensors 401 shows a thermal anomaly, then it is flagged in the data center management console in block 407 (e.g., where agents can react to alerts or other remedial actions are triggered/performed). In some embodiments, the thermal anomaly detection models comprise Convolutional Neural Network (CNN) models. FIG. shows an architecture 500 for a CNN model that may be used in some embodiments. The architecture 500 includes preprocessed input thermal images 501 (e.g., from block 403 in the system flow 400) which are provided to convolutional layers 503. The output of the convolutional layers 503 is provided to pooling layers 505 (e.g., maxpooling layers). The output of the pooling layers 505 is provided to Rectified Linear Unit (ReLU) layers 507, and the output of the ReLU layers 507 is provided to an output layer 509 (e.g., a softmax layer) that outputs any detected thermal anomalies in the preprocessed input thermal images 501. In some embodiments, the output from the output layer 509 is one of two classifications- "normal" if an input thermal image does not have any thermal anomalies and "error" if at least one thermal anomaly is detected in the input thermal image and action is needed.

In some embodiments, multiple distinct thermal anomaly detection models are used. The use of multiple distinct thermal anomaly detection models is useful, as in a data center or other IT infrastructure environment, there are often two distinct types of aisles or other areas: (1) "cold" aisles or areas which are the source of air that cools servers or other IT assets and (2) "hot" aisles or areas which are the destination of hot air that has passed through servers or other IT assets. To accurately detect thermal anomalies, it is useful to tag specific thermal imaging feeds (e.g., from thermal cameras or other thermal imaging sensors) or portions thereof as belonging to a "cold" aisle/area or a "hot" aisle/area.

Figure 6:
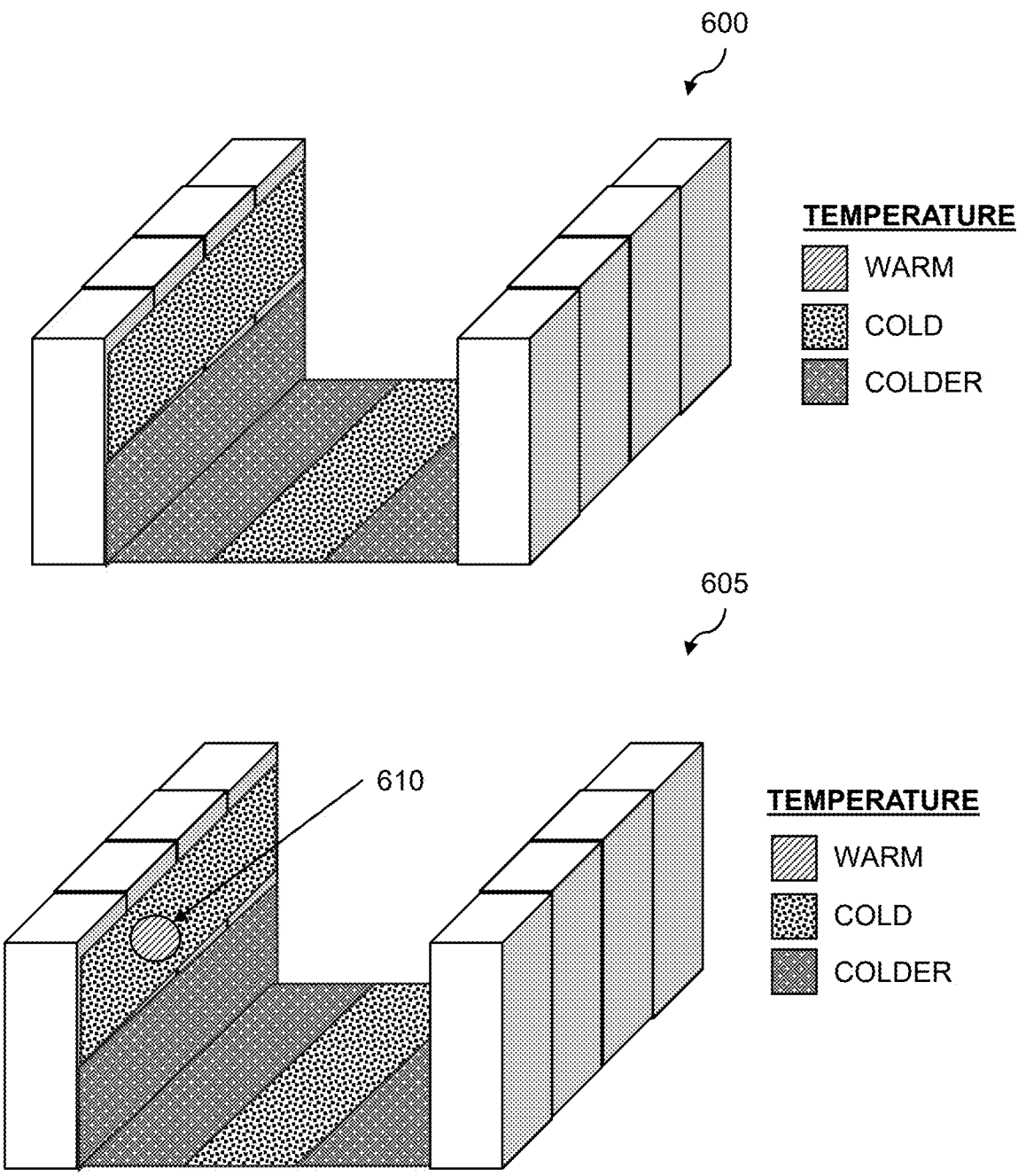
FIG. 6 shows examples of thermal images of a cold aisle of a data center with and without a thermal anomaly in an illustrative embodiment.
Figure 7:
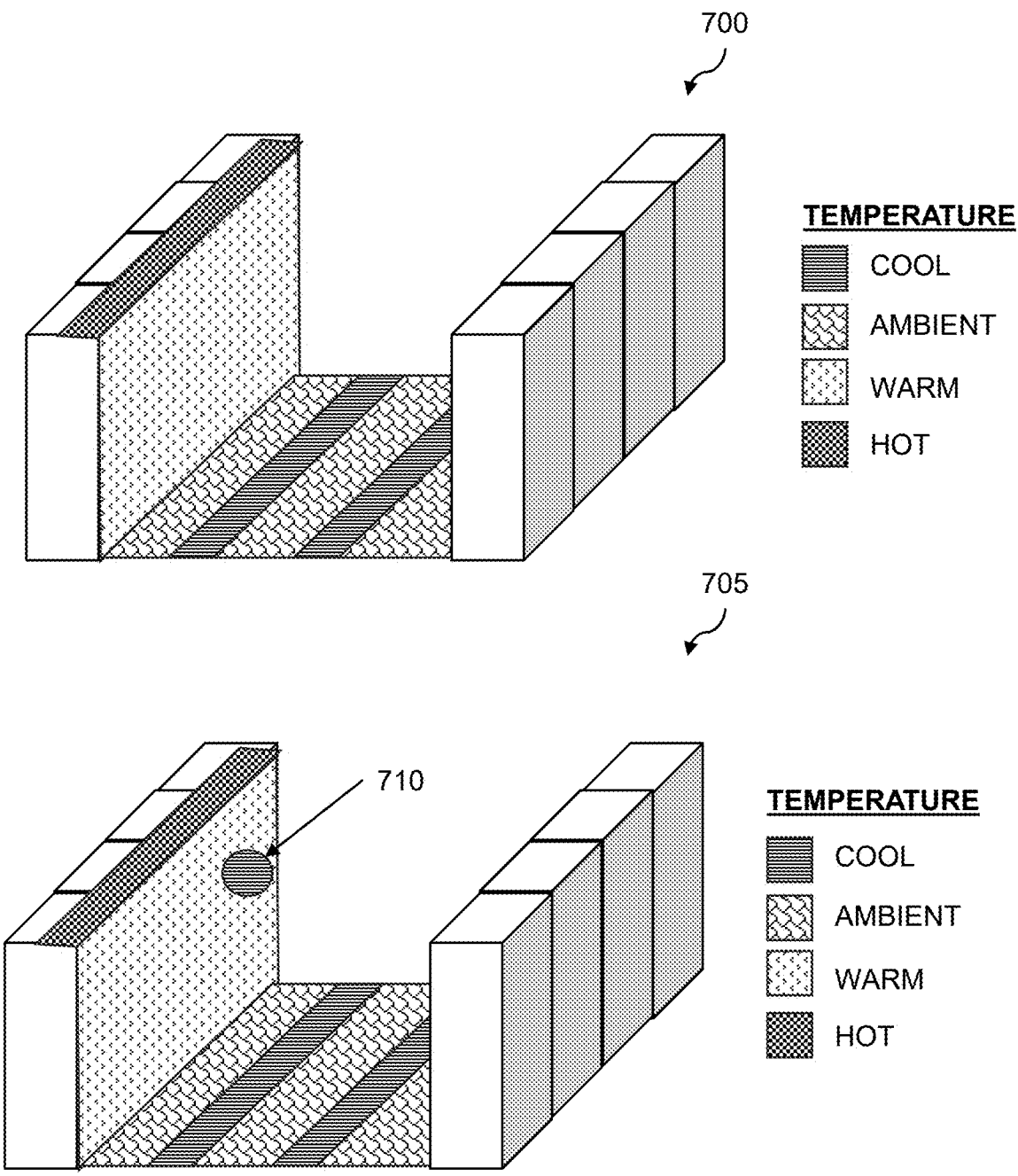
FIG. 7 shows examples of thermal images of a hot aisle of a data center with and without a thermal anomaly in an illustrative embodiment.

FIG. 6 shows an example thermal image 600 of a cold aisle of a data center, where the expected thermal characteristics include "cold" or "colder" regions. FIG. 6 further shows an example thermal image 605 of the cold aisle where a thermal anomaly 610 is detected, where the thermal anomaly represents a "warm" region that is not expected to be present in the cold aisle. The thermal anomaly 610 indicates that something unusual is happening on the second rack on the left aisle, where the warm region suggests areas of heat which should not be present. This scenario, when passed into a suitably trained cold thermal anomaly detection model, will generate an "error" classification for this scene. FIG. 7 shows an example thermal image 700 of a hot aisle of a data center, where the expected thermal characteristics include "ambient", "warm" and "hot" regions. FIG. 7 further shows an example thermal image 705 where a thermal anomaly 710 is detected, where the thermal anomaly represents a "cold" region that is not expected to be present in the hot aisle. Thus, as can be seen, thermal anomalies in cold aisles and hot aisles will look very different from one another. In colorized thermal images, blue may represent cold while green represents cool, yellow represents ambient, orange represents warm, and red represents hot. An anomaly in a cold aisle, for example, may include an area of orange/red that is expected to be a blue/green cold zone. An anomaly in a hot aisle, for example, may be an area of blue/green that would typically be a yellow/orange warm zone, or a relatively large segment of red in what would typically be a yellow/orange warm zone with little spots of red. Various other examples are possible.

The datasets for training of thermal anomaly detection models (e.g., both "hot" and "cold" thermal anomaly detection models) may be based on thermal image data which is streamed from a real-world or actual data center or other IT infrastructure environment. For example, thermal imaging sensors may be mounted at designated locations to stream the "steady" state for cold and hot data center aisles. Since generally data centers look similar (although different data centers may have different cooling systems), thermal anomaly detection models which are trained in one data center or other IT infrastructure environment may be transferrable to other data centers or IT infrastructure environments with thermal imaging capabilities. It should be appreciated, however, that thermal anomaly detection models could be custom-built or at least fine-tuned (e.g., using transfer learning) for specific data centers or other IT infrastructure environments if desired.

To build the initial dataset, frames are taken from thermal image streams (e.g., from cold and warm aisles). This will generate excessive amounts of data for a known "good" state, and such data can be tagged as the "normal" class in the dataset. To generate negative datasets representing the "error" or thermal anomaly class, various actions may be performed including: removing some blanks in a rack to allow hot air flow back into a cold aisle (or vice versa), generating thermal anomalies for the "error" class for cold and hot thermal anomaly detection model training; turning down cooling systems for a period of time to capture the impact on both the cold and hot aisle thermal images and using those frames as part of the "error" class in the dataset for cold and hot thermal anomaly detection model training; placing a box or other obstruction of a vent in either a warm or a cold aisle and capturing its impact on cooling and using those frames as part of the "error" class in the dataset for cold and hot thermal anomaly detection model training; editing or annotating images by adding "issues" (e.g., adjusting the color in specific regions, such as changing blue/green/yellow to red, blue to yellow/orange/red, etc.) or moving issues to different parts of the thermal images which can be used as part of the "error" class in the dataset for cold and hot thermal anomaly detection model training; etc.

Once sufficient training data is obtained, thermal anomaly detection models are trained to have the thermal anomaly detection models "learn" the scene of a data center or other IT infrastructure environment. In some embodiments, this involves picking either the cool or hot thermal anomaly detection model, and allowing a set duration of time after install where the model uses thermal image frames from the data center or other IT infrastructure environment and automatically applies transfer learning to tune the model to that specific data center or other IT infrastructure environment. This will improve the "normal" dataset, as it is unlikely that "error" conditions will exist on install of the model. If errors are present, however, then the learning phase can be tuned to indicate the error state.

The raw data from thermal cameras, which are examples of what are more generally referred to herein as thermal imaging sensors, is often in a grayscale format which is difficult for human annotation. While this raw format could be used as input for the thermal anomaly detection models, it is not easy to accurately label anomalies by humans (e.g., which is useful at least for the purpose of generating training data for the thermal anomaly detection models). For this reason, in some embodiments, thermal image data is color encoded before training or inference using the thermal anomaly detection models. To convert thermal images to a colorized temperature map, various tools may be utilized, such as the Open Computer Vision (OpenCV) library.

Securing sufficient data for training of the thermal anomaly detection models presents technical challenges. In some embodiments, the thermal anomaly detection models are CNN-based, and can generalize well on pixel formations for detecting thermal anomalies. In some embodiments, the thermal anomaly detection models utilize a You Only Look Once (YOLO) CNN model, which is a CV model configured for real-time object detection, where thermal anomalies are classified as objects by the YOLO CNN model. The YOLO CNN model is trained from scratch, since pretrained models are based on camera or image data. Thermal video is very different, and thus requires custom models to be built. While training data for a "normal" case is easy to obtain, it is not very useful for training purposes. Thus, input thermal image data (e.g., which may be colorized) may have one or more frames annotated to highlight thermal anomalies. Such annotation may be achieved by drawing a bounding box on an area where a thermal anomaly is present. The annotated thermal image frames may be saved and used as training data (e.g., for the YOLO CNN model). It should be noted that this may be done for both "hot" and "cold" thermal anomalies. There are various ways to induce thermal anomalies and build synthetic data (e.g., colorizing images with "hot" or "cold" areas to annotate as anomalies).

Figure 8:
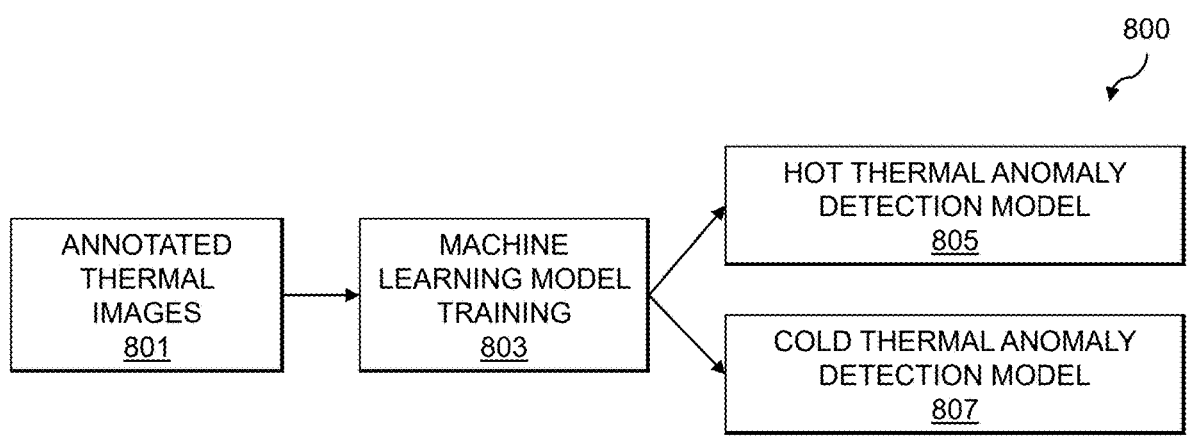
FIG. 8 shows a block diagram of a system flow for training hot and cold aisle thermal anomaly detection models utilizing annotated thermal images in an illustrative embodiment.

Once the training data is obtained, the thermal anomaly detection models (e.g., YOLO CNN models) may be trained as illustrated in the system flow 800 of FIG. 8. The training uses a designated test and training split of the input data, represented in FIG. 8 as the annotated thermal images 801. The annotated thermal images 801 are provided for ML model training in block 803. The ML model training involves iterating for a designated number (e.g., N) of epochs, and producing as output trained ML models. In the example of FIG. 8, the trained ML models include a "hot" thermal anomaly detection model 805 (e.g., for detecting thermal anomalies in hot aisles or areas of a data center) and a "cold" thermal anomaly detection model 807 (e.g., for detecting thermal anomalies in cold aisles or areas of a data center). Once the hot and cold thermal anomaly detection models 805 and 807 are built, they can be used for real-time thermal anomaly detection with thermal imaging sensors as a source. This flow may include preprocessing thermal image streams from thermal imaging sensors (e.g., using a colorizer model such as that provided by the OpenCV library) to convert the raw thermal images to heatmap-style images. The pre-processed thermal image streams are provided to the trained thermal anomaly detection models, and inference is executed. If thermal anomalies are detected, remedial action is triggered (e.g., such as alerting an agent to take action). Using the technical solutions described herein, it is possible to perform real-time thermal monitoring of a data center or other IT infrastructure environment using data from large numbers of thermal imaging sensors (e.g., hundreds of thermal cameras) at the same time.

The technical solutions described herein provide approaches for building thermal anomaly detection models that are tuned to detect thermal anomalies in a data center or other IT infrastructure environment. The thermal anomaly detection models can advantageously be utilized to enable real-time thermal monitoring as a data center or other IT infrastructure environment changes (e.g., due to installation of new and different IT assets, changes in workloads, etc. which can trigger cooling problems), and to detect other situations in which airflow is interrupted or not working as designed (e.g., due to failure of cooling systems, human error such as inadvertent obstruction of vents or improper blanking of spaces, etc.). The technical solutions enable building specialized thermal anomaly detection models, which can be customized for specific data centers or other IT infrastructure environments and/or specific regions or areas thereof (e.g., "hot" and "cold" aisles or areas). The technical solutions are further able to provide automated analysis of thermal imaging data from a large number of sources (e.g., potentially hundreds or thousands for thermal imaging sensors) in real-time. Further, the technical solutions enable thermal anomaly detection models to self-train on "live" thermal imaging data captured from a data center or other IT infrastructure environment.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based detection of thermal anomalies in IT infrastructure environments will now be described in greater detail with reference to FIGS. 9 and 10. Although described in the context of system 100, these platforms may also be used to implement at least portions of other information processing systems in other embodiments.

Figure 9:
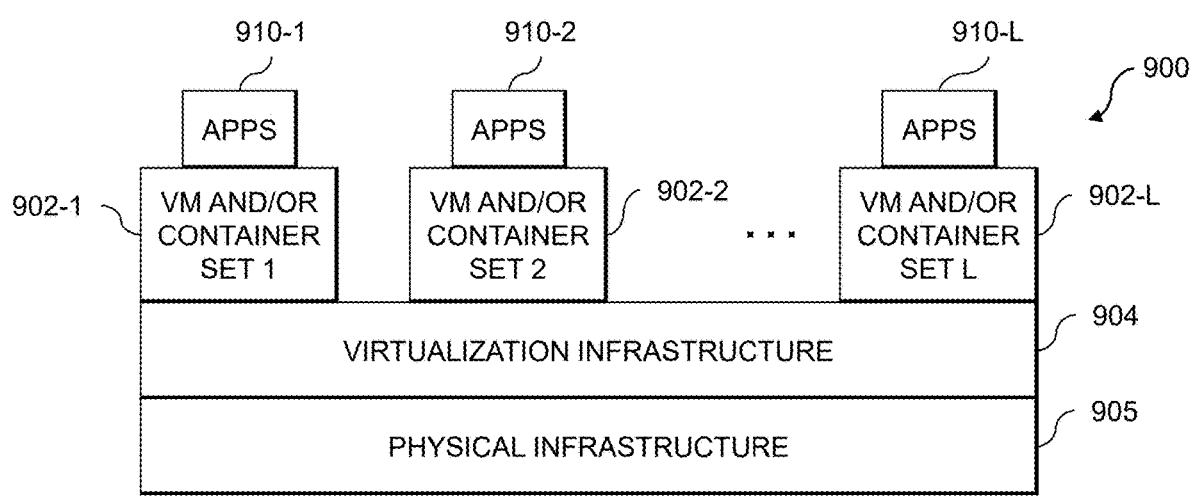
FIGS. 9 and 10 show examples of processing platforms that may be utilized to implement at least a portion of an information processing system in illustrative embodiments.
Figure 10:
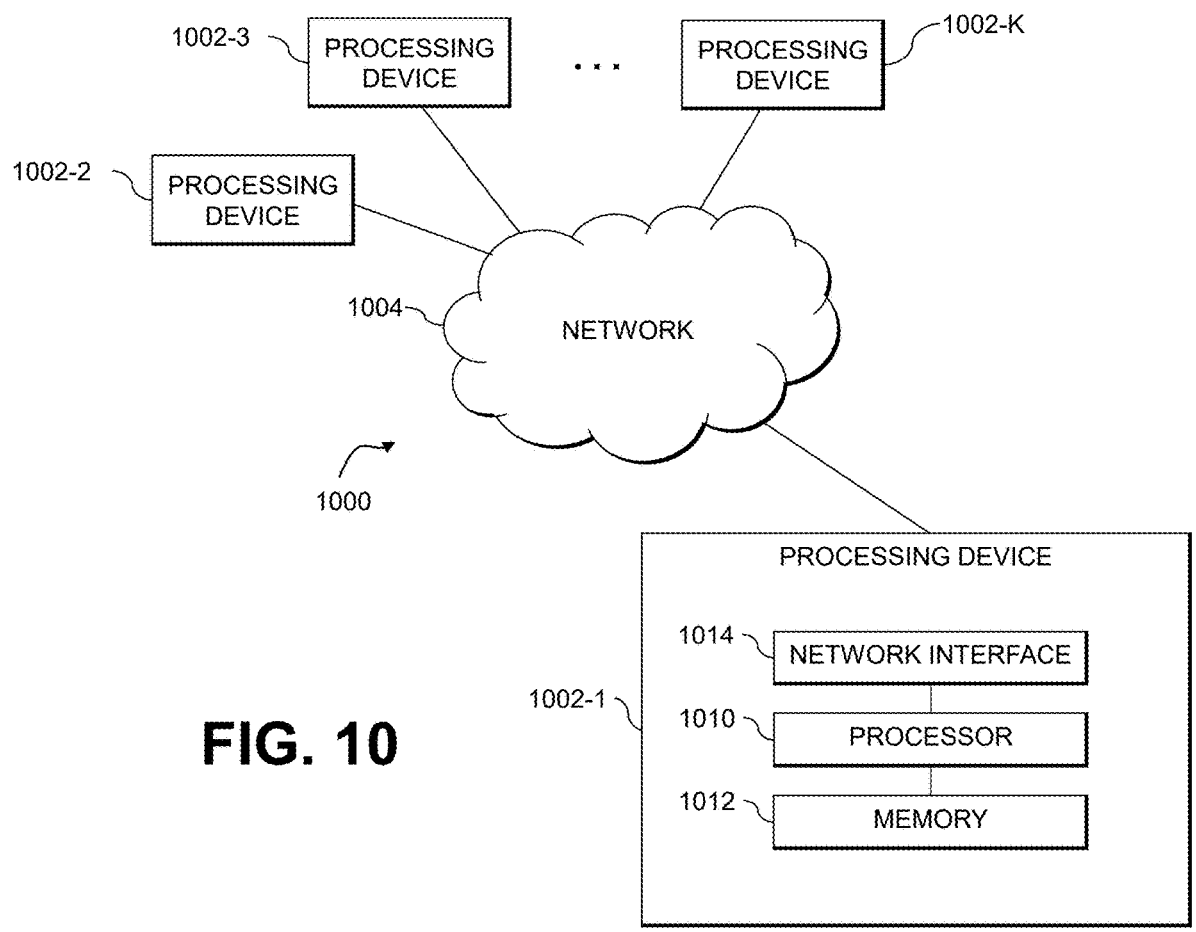

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based detection of thermal anomalies in IT infrastructure environments as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to generate a first data structure, the first data structure comprising thermal imaging data for at least one area of an information technology infrastructure environment obtained from two or more thermal imaging sensors in the information technology infrastructure environment;
to determine, for the at least one area of the information technology infrastructure environment, (i) a first portion of the thermal imaging data captured from a first subset of the two or more thermal imaging sensors positioned to capture thermal imaging of at least a portion of one or more airflow paths of a first type in the at least one area of the information technology infrastructure environment and (ii) a second portion of the thermal imaging data captured from a second subset of the two or more thermal imaging sensors positioned to capture thermal imaging of at least a portion of one or more airflow paths of a second type in the at least one area of the information technology infrastructure environment;
to process, utilizing a first thermal anomaly detection machine learning model trained to detect a first type of thermal anomalies in the one or more airflow paths of the first type in the at least one area of the information technology infrastructure environment, the first portion of the thermal imaging data to generate a first portion of a second data structure, the first portion of the second data structure characterizing one or more thermal anomalies of the first type detected in the at least one area of the information technology infrastructure environment;
to process, utilizing a second thermal anomaly detection machine learning model trained to detect a second type of thermal anomalies in the one or more airflow paths of the second type in the at least one area of the information technology infrastructure environment, the second portion of the thermal imaging data to generate a second portion of the second data structure, the second portion of the second data structure characterizing one or more thermal anomalies of the second type detected in the at least one area of the information technology infrastructure environment;

to select, based at least in part on the second data structure, one or more remedial actions to be performed in the information technology infrastructure environment for addressing the one or more thermal anomalies of the first type and the one or more thermal anomalies of the second type detected in the at least one area of the information technology infrastructure environment; and to perform at least one of the selected one or more remedial actions in the information technology infrastructure environment, the selected one or more remedial actions comprising modifying an operation of one or more cooling systems responsible for cooling the at least one area of the information technology infrastructure environment.

2. The apparatus of claim 1 wherein generating the first data structure comprises colorizing raw data obtained from the two or more thermal imaging sensors to generate a heat map of the at least one area of the information technology infrastructure environment.

3. The apparatus of claim 1 wherein at least one of the first thermal anomaly detection machine learning model and the second thermal anomaly detection machine learning model comprises a convolutional neural network model.

4. The apparatus of claim 1 wherein the at least one processing device is further configured to train the first and second thermal anomaly detection machine learning models utilizing a first set of data characterizing normal operation of airflows in the at least one area of the information technology infrastructure environment and a second set of data characterizing abnormal operation of the airflows in the at least one area of the information technology infrastructure environment.

5. The apparatus of claim 4 wherein the second set of data characterizing the abnormal operation of the airflows in the at least one area of the information technology infrastructure environment comprises thermal images annotated with one or more thermal anomalies.

6. The apparatus of claim 4 wherein the second set of data characterizing the abnormal operation of the airflows in the at least one area of the information technology infrastructure environment comprises data obtained from the two or more thermal imaging sensors in the at least one area of the information technology infrastructure environment while the operation of one or more cooling systems of the information technology infrastructure environment is modified.

7. The apparatus of claim 4 wherein the second set of data characterizing the abnormal operation of the airflows in the at least one area of the information technology infrastructure environment comprises data obtained from the two or more thermal imaging sensors in the at least one area of the information technology infrastructure environment while the airflows in the at least one area of the information technology infrastructure environment are at least temporarily intentionally altered.

8. The apparatus of claim 1 wherein modifying the operation of the one or more cooling systems is performed until root causes of the one or more thermal anomalies of the first type and the one or more thermal anomalies of the second type detected in the at least one area of the information technology infrastructure environment are identified and fixed.

9. The apparatus of claim 1 wherein the selected one or more remedial actions further comprises identifying and fixing a root cause of at least one of the one or more thermal anomalies of the first type and the one or more thermal anomalies of the second type detected in the at least one area of the information technology infrastructure environment.

10. The apparatus of claim 9 wherein identifying the root cause comprises identifying at least one of: an obstruction of one or more vents of at least one of the one or more cooling systems in the information technology infrastructure environment; and blanking of one or more rack-mounted slots of one or more equipment racks in the information technology infrastructure environment that alters airflow paths in the at least one area of the information technology infrastructure environment.

11. The apparatus of claim 9 wherein identifying the root cause comprises identifying at least one of: a malfunction of at least one of the one or more cooling systems in the information technology infrastructure environment; and a leak in a designed airflow path of the at least one area in the information technology infrastructure environment.

12. The apparatus of claim 1 wherein at least one of the first thermal anomaly detection machine learning model and the second thermal anomaly detection machine learning model comprises a computer vision model configured for real-time detection of designated object types.

13. The apparatus of claim 12 wherein the designated object types comprise thermal anomalies of the first type and thermal anomalies of the second type.

14. The apparatus of claim 1 wherein at least one of the first thermal anomaly detection machine learning model and the second thermal anomaly detection machine learning model is trained using transfer learning based at least in part on an intended airflow configuration of the at least one area of the information technology infrastructure environment.

15. The apparatus of claim 1 wherein the at least one area of the information technology infrastructure environment comprises a data center with a plurality of aisles, wherein a first subset of the plurality of aisles comprise provide the one or more airflow paths of the first type and a second subset of the plurality of aisles provide the one or more airflow paths of the second type.

16. The apparatus of claim 15 wherein the first subset of the two or more thermal imaging sensors are positioned at ends of one or more of the aisles in the first subset of the plurality of aisles and the second subset of the two or more thermal imaging sensors are positioned at ends of one or more of the aisles in the second subset of the plurality of aisles.

17. The apparatus of claim 15 wherein at least one of the two or more thermal imaging sensors comprises a ceiling-mounted thermal imaging sensor positioned to capture thermal imaging of at least a portion of at least one of the one or more airflow paths of the first type and at least a portion of at least one of the one or more airflow paths of the second type in the at least one area of the information technology infrastructure environment.

18. The apparatus of claim 15 wherein the two or more thermal imaging sensors comprises at least a first thermal imaging sensor and at least a second thermal imaging sensor positioned at different positions in a given aisle of the plurality of aisles.

19. A computer program product comprising a non-transitory processor-readable storage medium having stored therein program code of one or more software programs, wherein the program code when executed by at least one processing device causes the at least one processing device:

to generate a first data structure, the first data structure comprising thermal imaging data for at least one area of an information technology infrastructure environment obtained from one two or more thermal imaging sensors in the information technology infrastructure environment;

to determine, for the at least one area of the information technology infrastructure environment, (i) a first portion of the thermal imaging data captured from a first subset of the two or more thermal imaging sensors positioned to capture thermal imaging of at least a portion of one or more airflow paths of a first type in the at least one area of the information technology infrastructure environment and (ii) a second portion of the thermal imaging data captured from a second subset of the two or more thermal imaging sensors positioned to capture thermal imaging of at least a portion of one or more airflow paths of a second type in the at least one area of the information technology infrastructure environment;

to process, utilizing a first thermal anomaly detection machine learning model trained to detect a first type of thermal anomalies in the one or more airflow paths of the first type in the at least one area of the information technology infrastructure environment, the first portion of the thermal imaging data to generate a first portion of a second data structure, the first portion of the second data structure characterizing one or more thermal anomalies of the first type detected in the at least one area of the information technology infrastructure environment;

to process, utilizing a second thermal anomaly detection machine learning model trained to detect a second type of thermal anomalies in the one or more airflow paths of the second type in the at least one area of the information technology infrastructure environment, the second portion of the thermal imaging data to generate a second portion of the second data structure, the second portion of the second data structure characterizing one or more thermal anomalies of the second type detected in the at least one area of the information technology infrastructure environment;

to select, based at least in part on the second data structure, one or more remedial actions to be performed in the information technology infrastructure environment for addressing the one or more thermal anomalies of the first type and the one or more thermal anomalies of the second type detected in the at least one area of the information technology infrastructure environment; and to perform at least one of the selected one or more remedial actions in the information technology infrastructure environment, the selected one or more remedial actions comprising modifying an operation of one or more cooling systems responsible for cooling the at least one area of the information technology infrastructure environment.

20. A method comprising:

generating a first data structure, the first data structure comprising thermal imaging data for at least one area of an information technology infrastructure environment obtained from one two or more thermal imaging sensors in the information technology infrastructure environment;

determining, for the at least one area of the information technology infrastructure environment, (i) a first portion of the thermal imaging data captured from a first subset of the two or more thermal imaging sensors positioned to capture thermal imaging of at least a portion of one or more airflow paths of a first type in the at least one area of the information technology infrastructure environment and (ii) a second portion of the thermal imaging data captured from a second subset of the two or more thermal imaging sensors positioned to capture thermal imaging of at least a portion of one or more airflow paths of a second type in the at least one area of the information technology infrastructure environment;

processing, utilizing a first thermal anomaly detection machine learning model trained to detect a first type of thermal anomalies in the one or more airflow paths of the first type in the at least one area of the information technology infrastructure environment, the first portion of the thermal imaging data to generate a first portion of a second data structure, the first portion of the second data structure characterizing one or more thermal anomalies of the first type detected in the at least one area of the information technology infrastructure environment;

processing, utilizing a second thermal anomaly detection machine learning model trained to detect a second type of thermal anomalies in the one or more airflow paths of the second type in the at least one area of the information technology infrastructure environment, the second portion of the thermal imaging data to generate a second portion of the second data structure, the second portion of the second data structure characterizing one or more thermal anomalies of the second type detected in the at least one area of the information technology infrastructure environment;

selecting, based at least in part on the second data structure, one or more remedial actions to be performed in the information technology infrastructure environment for addressing the one or more thermal anomalies of the first type and the one or more thermal anomalies of the second type detected in the at least one area of the information technology infrastructure environment; and performing at least one of the selected one or more remedial actions in the information technology infrastructure environment, the selected one or more remedial actions comprising modifying an operation of one or more cooling systems responsible for cooling the at least one area of the information technology infrastructure environment;

wherein the method is performed by at least one processing device comprising a processor coupled to a memory.

* * * * *